United States Patent
Paritsky et al.

(10) Patent No.: US 6,462,808 B2
(45) Date of Patent: Oct. 8, 2002

(54) SMALL OPTICAL MICROPHONE/SENSOR

(75) Inventors: Alexander Paritsky, Modlln; Alexander Kots, Ashdod, both of (IL)

(73) Assignee: Phone-Or, Ltd., Or-Yehuda (IL)

( * ) Notice: Subject to any disclaimer, the term of this patent is extended or adjusted under 35 U.S.C. 154(b) by 0 days.

(21) Appl. No.: 09/823,963

(22) Filed: Mar. 27, 2001

(65) Prior Publication Data
US 2002/0012115 A1 Jan. 31, 2002

(30) Foreign Application Priority Data

Mar. 27, 2000 (IL) .................................................. 135281

(51) Int. Cl.$^7$ .............................. G01C 3/00; G01J 1/04; G02B 6/00

(52) U.S. Cl. .................... 356/4.01; 356/3.01; 356/4.07; 367/149; 385/12; 250/227.14; 250/227.28

(58) Field of Search ............................... 356/4.01, 3.01, 356/4.07; 367/149; 385/12; 250/227.14, 227.28

(56) References Cited

U.S. PATENT DOCUMENTS

| | | | |
|---|---|---|---|
| 4,758,065 A | | 7/1988 | Dorman et al. |
| 5,031,987 A | | 7/1991 | Norling |
| 5,089,697 A | * | 2/1992 | Prohaska |
| 5,771,091 A | * | 6/1998 | Paritsky et al. ............ 356/4.01 |
| 5,969,838 A | * | 10/1999 | Paritsky et al. |
| 6,239,865 B1 | * | 5/2001 | Paritsky et al. ............ 356/4.07 |

FOREIGN PATENT DOCUMENTS

| | | |
|---|---|---|
| CH | 455 304 A | 6/1968 |
| EP | 0 263 016 A | 4/1988 |
| EP | 0 274 772 A | 7/1988 |
| FR | 2 739 445 A | 4/1997 |
| JP | 58 038903 A | 3/1983 |
| WO | WO 99 49302 | 9/1999 |

\* cited by examiner

*Primary Examiner*—Stephen C. Buczinski
(74) *Attorney, Agent, or Firm*—Townsend and Townsend and Crew LLP

(57) ABSTRACT

The invention provides a small optical microphone/sensor (2) for measuring distances to, and/or physical properties of, a reflective surface, comprising a source of light (4) coupled to a light waveguide (6) for transmitting a light beam through the waveguide; the waveguide (6) having at one of its ends a pointed face (12) with an angle determined by Snell's Law of Refraction $$\frac{\sin\alpha_1}{\sin\alpha_2} = \frac{n_2}{n_1}$$

wherein $\alpha_1$ is the angle of travel of the light beam through the waveguide media; $\alpha_2$ is the angle of travel of the light beam in a second media when exiting from the pointed face, and $n_1$ and $n_2$ are the light indices of the light waveguide media and the second media; the reflective surface being disposed at an optimal distance from the pointed face (12) as determined by the angle $\alpha_2$; the waveguide having, at its outer surface, at least adjacent to the pointed face, means (19) for preventing light waves impinging on the surface from being reflected back into the waveguide, and a light detector (18) arranged to receive the light reflected from the surface.

13 Claims, 2 Drawing Sheets

SMALL OPTICAL MICROPHONE/SENSOR

FIELD OF THE INVENTION

The present invention relates to optical microphones and sensors. More particularly, the present invention relates to an optical microphone for measuring distances to, and/or physical properties of, a medium, in accordance with the teachings of U.S. Pat. No. 5,771,091, which teachings are incorporated herein by reference.

BACKGROUND OF THE INVENTION

The device disclosed in U.S. Pat. No. 5,771,091 is a very sensitive and compact device for measuring distances to, and/or physical properties of, a medium. At the same time, often there is a need for a smaller, more compact device that will facilitate the performance of measurements within tiny available spaces in different apparatus.

DISCLOSURE OF THE INVENTION

It is therefore a broad object of the present invention to provide a small, optical microphone/sensor for measurement of sound pressures in microphones, static pressures in, e.g., pressure sensors, accelerations (accelerometers), temperatures (thermometers), and different other parameters in locations where it is very problematic to accommodate any other known sensors, because of their relatively large size.

The diameter of the small optical sensor of the present invention is limited and defined by the diameter of existing light waveguides, such as optical fibers, and may be in the range of less than one millimeter, or between one and two millimeters.

It is an additional object of the present invention to provide low cost, small optical microphone/sensors.

It is another object of the present invention to provide small optical microphone/sensors that are capable of working in wide ranges of temperature up to several hundred degrees Celsius.

The present invention therefore provides a small optical microphone/sensor for measuring distances to, and/or physical properties of, a reflective surface, comprising a source of light coupled to a light waveguide for transmitting a light beam through said waveguide; said waveguide having at one of its ends a pointed face or pick form end surface with an angle determined by Snell's Law of Refraction $$\frac{\sin\alpha_1}{\sin\alpha_2} = \frac{n_2}{n_1}$$

wherein $\alpha_1$ is the angle of travel of the light beam through the waveguide media; $\alpha_2$ is the angle of travel of the light beam in a second media when exiting from the pointed face, and $n_1$ and $n_2$ are the light indices of the light waveguide media and the second media; the reflective surface being disposed at an optimal distance from the pointed face as determined by the angle $\alpha_2$; the waveguide having, at its outer surface, at least adjacent to the pointed face, means for preventing light waves impinging on said surface from being reflected back into the waveguide, and a light detector arranged to receive the light reflected from said surface.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for fundamental understanding of the invention, the description taken with the drawings making apparent to those skilled in the art how the several forms of the invention may be embodied in practice.

In the drawings:

FIG. 1 is an optical scheme of a small optical microphone/sensor having a splitter according to the present invention;

FIG. 2 is an optical scheme of a small optical microphone/sensor having a partition, and FIG. 3 is an optical scheme of another embodiment of a small microphone/sensor with a partition.

DETAILED DESCRIPTION

Figure 1:
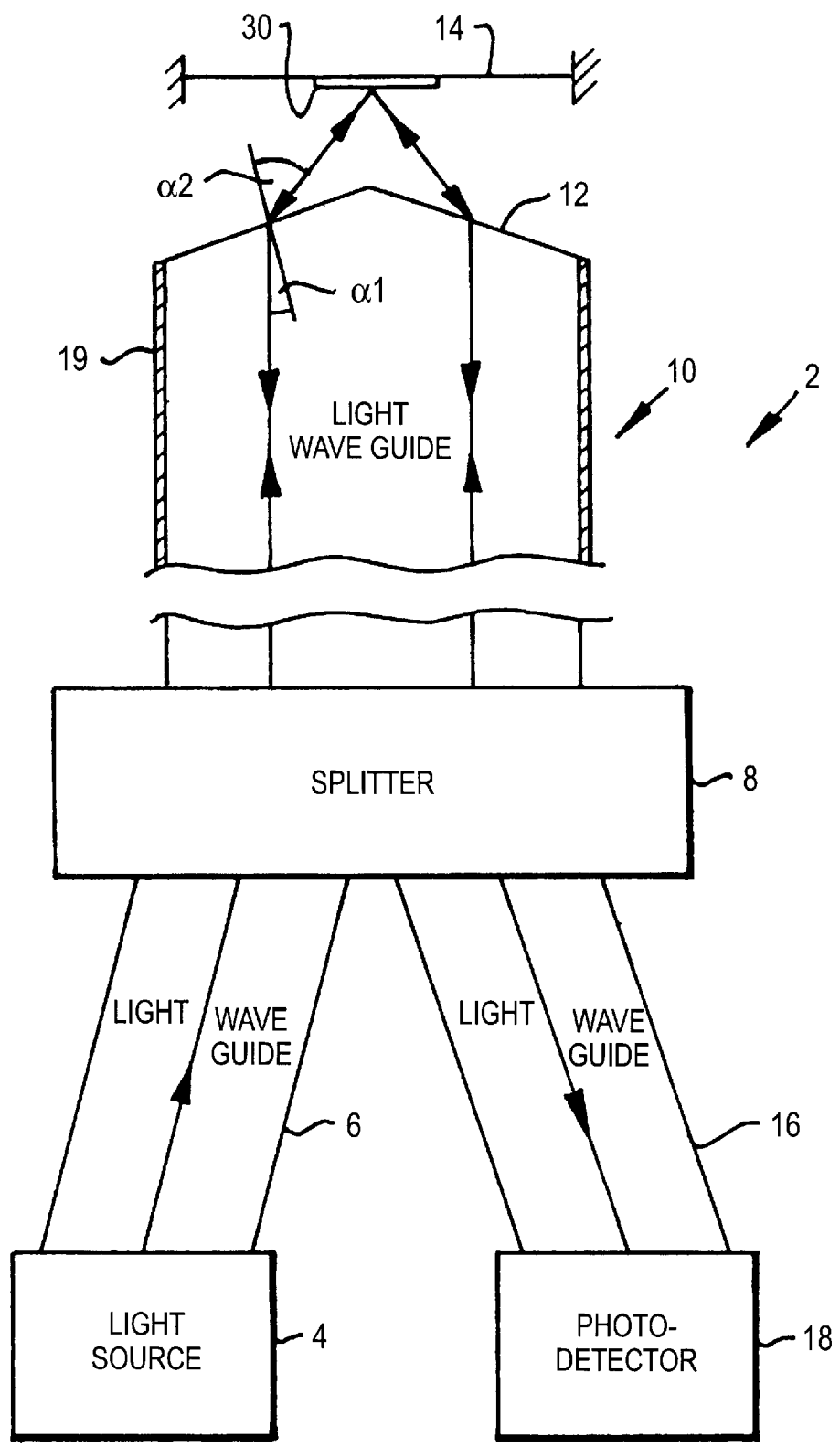

There is shown in FIG. 1 an optical scheme of a small optical microphone/sensor 2 according to the invention, comprising a light source 4, e.g., a LED, in optical contact with a light waveguide 6, e.g., an optical fiber or a solid waveguide. The light from light source 4 is transmitted to a splitter 8 and after it passes through the splitter, it proceeds along a light waveguide portion 10 to pointed face 12. Face 12 has a pick form surface with planes inclined at an angle to the horizontal $\alpha_1$ and the light exits from face 12 at an angle $\alpha_2$, according to Snell's Law of Refraction $$\frac{\sin\alpha_1}{\sin\alpha_2} = \frac{n_2}{n_1}$$

wherein $\alpha_1$ is the angle between the travel direction of said light beam through the light waveguide 10 and the planes of said pick form surface of said pointed face, and $\alpha_2$ is the angle of the light beam in the air. Light is reflected from a reflecting surface 14, e.g., an acoustical membrane, and impinges on the face 12 at angle $\alpha_2$, refracted into the light waveguide portion 10 at the angle $\alpha_1$, and proceeds along the light waveguide to the light waveguide splitter 8, to light waveguide portion 16 and then to a light detector 18 which registers the incoming light intensity modulation. It is important to note that light is emitted from the entire face 12 of the light waveguide; similarly, the light reflected from surface 14 enters the light waveguide through the entire face 12. In order to prevent light from being reflected from the side surfaces of the waveguide back into the body of the waveguide, at least the upper outer surface of the waveguide is provided with light-absorbing means 19. Such means can be constituted by a coating of light-absorbing material or by machining the outer surface in order to render it with a texture which prevents the reflection of light in the direction of detector 18.

Figure 2:
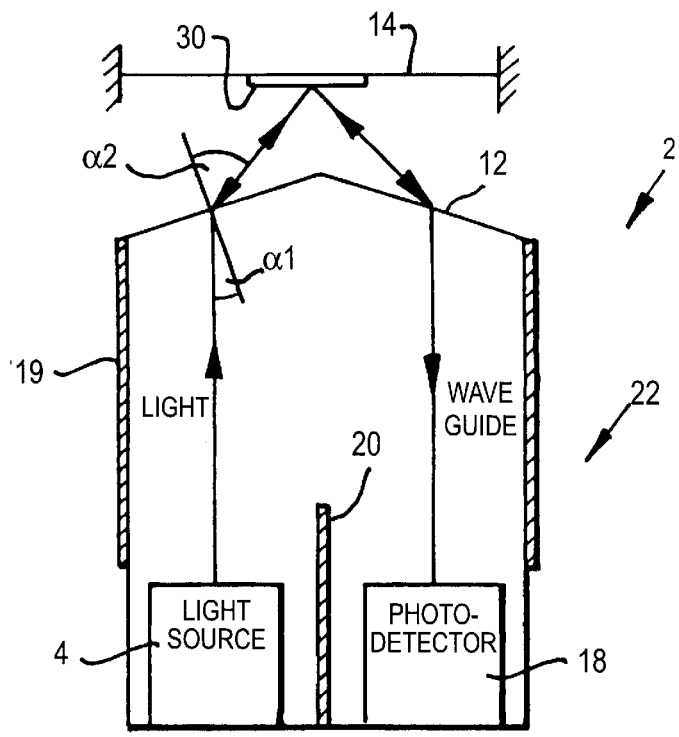

FIG. 2 illustrates an optical scheme of another embodiment of a small optical microphone/sensor 2 without the use of a splitter, comprising a light source 4, e.g., an LED, a light detector 18 separated by an opaque partition 20 preventing direct optical communication between light source 4 and the light detector 18. The light source 4, light detector 18 and partition 20 are embedded at one end of a light waveguide 22 having a face 12 as described above with reference to FIG. 1. Light produced by light source 4 exits the face 12 at an angle $\alpha_2$ reflected by a surface 14, enters light waveguide 22 and is received by the detector 18 to be utilized as required. Light absorbing means 19 is also provided on the upper outer surface of waveguide 22.

Figure 3:
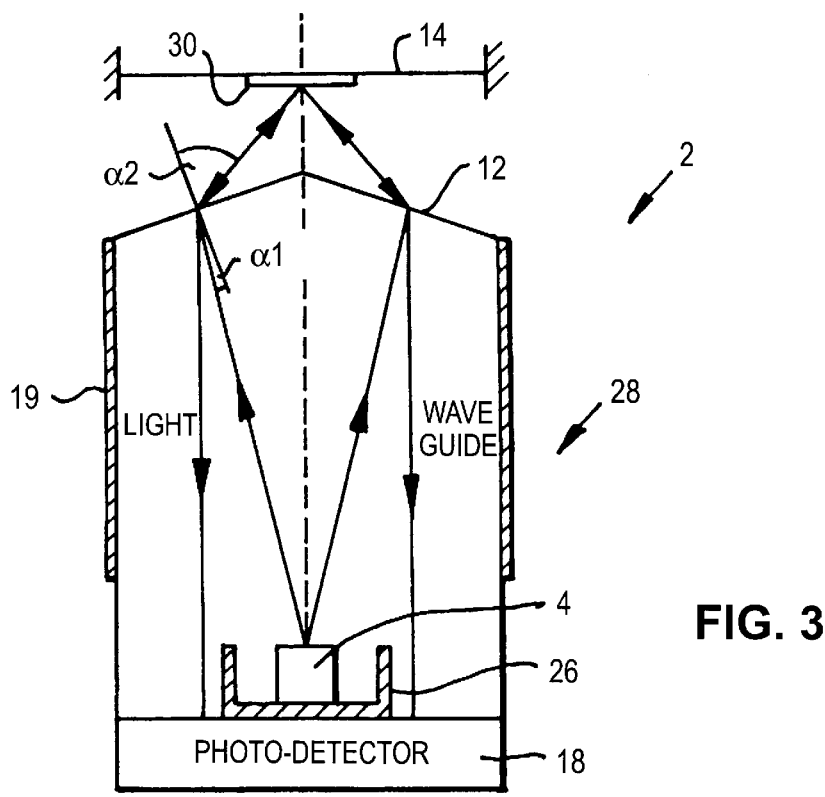

A third possible embodiment of a small microphone/sensor according to the present invention is shown in FIG. 3. Seen is a waveguide 28 having light-absorbing means 19, light source 4 separated from the light detector 18 by an opaque U-shaped partition 26. The light source 4, the light detector 18 and the partition 26 are set at one end of a light waveguide 28 having an opposite upper face 12.

In all three embodiments of FIGS. 1, 2 and 3, there is shown a small gold coating spot 30, made in the center of the reflecting surface 14 for improved reflection of light under a wide range of temperatures.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A small optical microphone/sensor for sensing distances to, and/or physical properties of, a reflective surface, comprising:

a source of light coupled to a light waveguide for transmitting a light beam through said waveguide;

said waveguide having at one of its ends a pointed face of a pick form end surface of said pointed face; with an angle determined by Snell's Law of Refraction $$\frac{\sin\alpha_1}{\sin\alpha_2} = \frac{n_2}{n_1}$$

wherein:
   $\alpha_1$ is the angle between travel direction of said light beam through the waveguide media and planes of said pick form surface of said pointed face;
   $\alpha_2$ is the angle of travel of said light beam in a second media when exiting from said pointed face, and
   $n_1$ and $n_2$ are the light indices of said light waveguide media and said second media;

said reflective surface being disposed at an optimal distance from said pointed face as determined by the angle $\alpha_2$;

said waveguide having, at its outer surface, at least adjacent to said pointed face, means for preventing light waves impinging on said surface from being reflected back into said waveguide, and a light detector arranged to receive the light reflected from said surface.

2. The optical microphone/sensor as claimed in claim 1, wherein said light waveguide has a first portion proximal to said pointed face and a second portion distal to said pointed face, said light source and said light detector being coupled to said second portion.

3. The optical microphone/sensor as claimed in claim 2, wherein at least one of said light source and said light detector is embedded in said second portion.

4. The optical microphone/sensor as claimed in claim 2, wherein said second portion is a split portion, said light source is coupled to one part of said split portion, and said light detector is coupled to another part of said split portion.

5. The optical microphone/sensor as claimed in claim 4, wherein at least said second portion is constituted by optical fibers.

6. The optical microphone/sensor as claimed in claim 4, further comprising a splitter coupled between said first and second portions.

7. The optical microphone/sensor as claimed in claim 2, further comprising an opaque partition extending between said light source and said light detector.

8. The optical microphone/sensor as claimed in claim 6, wherein said light source and said light detector are laterally displaced from each other.

9. The optical microphone/sensor as claimed in claim 2, wherein said light source is centrally located in said second portion and said light detector is coupled below a partition separating the light source from the detector, so as to receive reflected light passing through said light waveguide around said partition.

10. The optical microphone/sensor as claimed in claim 1, wherein said reflective surface is a membrane.

11. The optical microphone/sensor as claimed in claim 10, wherein said membrane is provided, at least at its central surface, with a highly reflective coating.

12. The optical microphone/sensor as claimed in claim 1, wherein said means for preventing light waves from being reflected is a light-absorbing material coated on the outer surface of said waveguide.

13. The optical microphone/sensor as claimed in claim 1, wherein said means for preventing light waves from being reflected is obtained by machining the outer surface of said waveguide.

* * * * *